United States Patent [19]

Gorshe

[11] Patent Number: 4,757,501
[45] Date of Patent: Jul. 12, 1988

[54] METHOD FOR ZERO BYTE TIME SLOT INTERCHANGE

[75] Inventor: Steve S. Gorshe, Glendale, Ariz.

[73] Assignee: GTE Communication Systems Corporation, Phoenix, Ariz.

[21] Appl. No.: 944,102

[22] Filed: Dec. 22, 1986

[51] Int. Cl.$^4$ .............................. H04J 3/00; H04J 3/12
[52] U.S. Cl. .................................... 370/99; 370/110.1
[58] Field of Search ............... 370/68, 99, 110.1, 68.1, 370/100; 379/65, 93, 94

[56] References Cited

U.S. PATENT DOCUMENTS

| | | | |
|---|---|---|---|
| 4,254,461 | 3/1981 | Chemla et al. | 364/200 |
| 4,394,759 | 7/1983 | Delle Donde | 370/110.1 |
| 4,685,100 | 8/1987 | Coppens et al. | 370/110.1 |

Primary Examiner—Douglas W. Olms
Assistant Examiner—Frank M. Scutch, III
Attorney, Agent, or Firm—Frank J. Bogacz; Peter Xiahros

[57] ABSTRACT

This method is a scheme for suppressing excessive amounts of logic zeros transmitted via T-carrier line facilities between switching systems or channel banks. This scheme provides proper zero bit suppression for alternating mark inversion signalling (AMI). A proper AMI signal contains no more then 15 consecutive logic zero bit positions. In addition, a proper AMI signal should contain a logic 1 density of an average of one logic 1 per 8-bits of information over every consecutive 3 octet group. This scheme provides for encoding and decoding a 4 frame octet group of an extended superframe. Logic ones are introduced into octets which would otherwise violate the AMI signalling rules. These logic ones are then removed by the receiving system and replaced with the indicated all zero octets before being given to down stream processing.

13 Claims, 4 Drawing Sheets

METHOD FOR ZERO BYTE TIME SLOT INTERCHANGE

CROSS REFERENCE TO RELATED APPLICATIONS

The present application is related to co-pending applications U.S. Ser. Nos. 86-7-039 and 86-7-040, having the same inventive entity and being assigned to the same assignee as the present application. The present application is also related to copending U.S. applications Ser. Nos. 902,825; 902,826; and 902,823, each is assigned to the same assignee as is the present application.

BACKGROUND OF THE INVENTION

The present invention pertains to data transfer between switching and transmission systems and more particularly to a line format for zero byte time slot interchange which satisfies T1 line zero suppression requirements.

T1 transmission line facilities operate at 1.544M bits per second. The T1 line transmission facilities utilize an alternating mark inversion (AMI) signaling scheme. This AMI signal contains no more than 15 consecutive zero bit positions in a particular T1 bit stream. This requirement of not more than 15 zero bits in a string derives from the operation of repeaters in T1 transmission line systems. Commonly used repeaters may not operate within specification if more than 15 consecutive zeroes are transmitted. Repeater synchronization cannot be guaranteed for bit streams with more than 15 consecutive zeroes.

One technique used for T1 line 0 bits suppression is bipolar with 8 zeroes substitution (B8ZS). The B8ZS technique utilizes two special coding patterns containing bipolar violations which are substituted for strings of 8 zeroes in the input signal stream. Upon detecting bipolar violations with either of the two special patterns, the receiver places 8-bits of zeroes in the corresponding positions in the output bit stream.

One technical disadvantage of the B8ZS technique is that it violates the AMI signaling standard on T1 lines. Since bipolar violations normally indicate transmission errors, the deliberate introduction of these transmission errors by B8ZS signaling reduces the effectiveness of determining real errors which are detected by the AMI signaling scheme. Another disadvantage of the B8ZS technique is that it detects strings of 8 zeroes and substitutes the special violation patterns more frequently than the specified T1 line operation requires. In addition to these disadvantages, the B8ZS patterns will not propagate through standard multiplexer derived DS1 facilities or protected T1 facilities.

Severe economic disadvantages obtain for the introduction of the B8ZS technique into the North American transmission network. This introduction would require a global replacement of existing multiplexers, automatic protection switches, electronic cross-connect devices (DACS), digital switch interface hardware and any other item in the network with violation monitor and removal (VMR). Such an introduction of the B8ZS technique presents an unreasonably large capital investment requirement to change network hardware.

SUMMARY OF THE INVENTION

A data transmission system includes first and second digital switching systems. These digital switching systems are connected via T-carrier line facilities for the bidirectional transmission of data. Each of switching systems includes a method for zero byte time slot interchange.

The zero byte time slot interchange method first examines a fixed number of octets (8-bit quantities) of a plurality of frames for detecting an all zero octet. Next, the method tests for a violating all zero octet. A violating all zero octet is one which has less than 3 logic ones over 15 adjacent bit positions or has more than 14 consecutive bits of zero in its contents. An address of a violating all zero octet is inserted into the next violating all zero octet. The steps of examining, testing and inserting are iterated for each of the octets of the plurality of frames.

Another test is made for detecting whether the first octet is a violating all zero octet. This is performed after completion of the examination of all octets of the plurality of frames. The address corresponding to the first octet is placed in a predetermined octet position within the plurality of frames, in response to a detection that the first octet is a violating all zero octet.

A BRIEF DESCRIPTION OF THE DRAWINGS

DESCRIPTION OF THE PREFERRED EMBODIMENT

Figure 1:
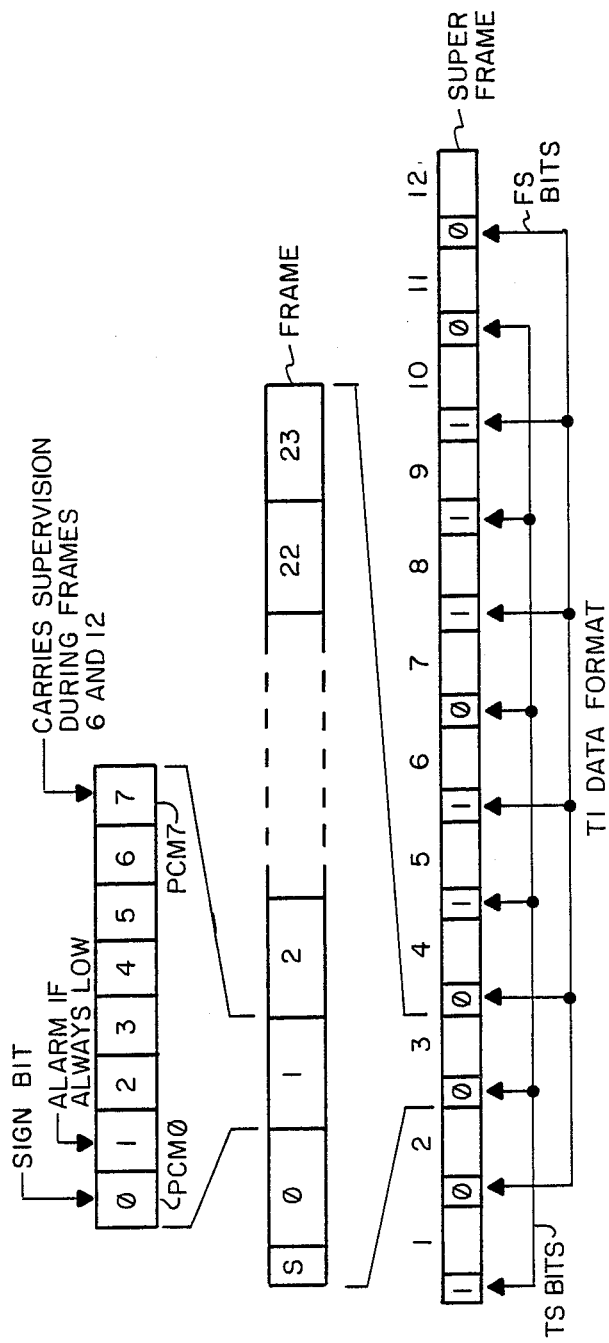
FIG. 1 is a layout diagram of typical T1 frame data format.

The structure of the T1 line format is based on the standard 1.544M bits per second DS1 digital signal format. This structure is shown in FIG. 1. The DS1 frame contains 193 bits of information. This information is organized into a single bit of synchronization or framing data plus 192 bits of payload data. The 192 bits of payload data are organized into 24 channels, each channel containing 8-bits and can be referred to as an octet.

In the DS1 signaling, the least significant bit, PCM 7, of each octet in every sixth frame is commonly used as a robbed or stolen signaling bit to indicate the signaling states of the active channels. These signaling bits are transmitted at a rate of 24 bits per 6 frames or 4 bits per frame.

Each channel (octet) consists of eight bits, PCM0-PCM7. PCM0 is a sign bit. PCM1-PCM7 give the magnitude of the voice sample. PCM1 may also be used to convey alarm indications. PCM7 is used to carry supervision information during frames 6 and 12.

Twenty-four channels are organized together with an S bit to form a frame. Each voice sample in the frame is associated with one channel of voice (or data). The channels are numbered 0-23. The S bit carries a periodic pattern which, when detected, is used to identify the beginning of each frame of data. Twelve frames of data are organized to form a "super frame". During frames 6 and 12 of the super frame, PCM7 is used to carry supervision information associated with each of the 24 channels. The periodic pattern of data carried by the S bit also makes it possible to identify the individual frames within a super frame.

The pattern carried on the S bit is as follows (the first bit is associated with frame 0): "100011011100". It can be seen that during the odd numbered frames, the S bit forms an alternating pattern of "1"s and "0"s, i.e., "101010". This alternating pattern is referred to as the TS pattern and is used to identify the starting position of the frames. During the even numbered frames the S bit carries the pattern "001110", where the first "1" indicates the beginning of frame 6. This pattern is referred to as the FS pattern and is used to identify the position within a super frame.

Examination of FS bits is an analogous procedure to that of the TS bits, except for the fact that no check is made for FS bits occurring during frames 2 and 8.

Figure 2:
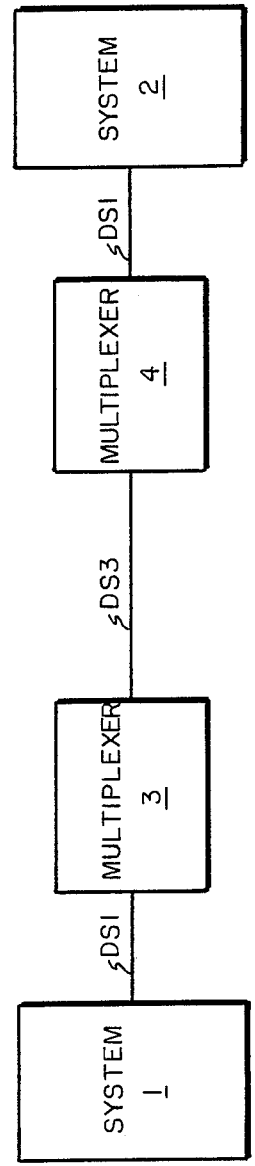
FIG. 2 is a block diagram of interconnected telecommunications systems.

In FIG. 2, system 1 is shown connected to system 2. System 1, which may comprise a telecommunication switching system or a channel bank, is shown connected to multiplexer 3. This connection is accomplished by a transmission line employing T1 or DS1 transmission. The transmission rate of a T1 or DS1 transmission line is 1.544 Megabits per second. Similarly, system 2 is shown connected via another DS1 transmission line to multiplexer 4. Multiplexers 3 and 4 may be connected via a high speed transmission line, such as a DS3 transmission line. The DS3 transmission line transmits data at approximately a 45 Megabit per second rate.

The standard superframe as shown in FIG. 1 contains 12 frames of information. For purposes of this method it is assumed that an extended superframe will be employed. This extended superframe includes 24 frames of information.

In order to provide multiplexers, such as multiplexers 3 and 4, and repeaters with the proper ones (logic 1S) density of data on the transmission line, the following requirements must be achieved. First, no more than 15 consecutive bits of zero may appear within a transmitted string of data. Second, a proper density of logic ones must be maintained. This means that at least one logic one is required within each consecutive 8-bits of information or that on average there must be at least one logic one per 8-bits (an octet or channel) over 3 consecutive channels (or 24 bits).

The present zero byte time slot interchange (ZBTSI) method provides for flagging each group of 4 frames (or 96 octets) for violations of either of the above mentioned requirements. For example, if system 1 were transmitting information to system 2, the logic of system 1 would format a particular 4 frame group in the manner taught by this method. This 4 frame group would be transmitted via multiplexers 3 and 4 to system 2. Since multiplexers 3 and 4 and any intervening repeater circuitry (not shown) are standard commercially available equipment, the method would provide the proper ones density and inhibit the production of any zero octets which violate the consecutive zeros rule. The newly formatted data would be transparent to all multiplexers and repeaters since it would have the proper ones density. Upon receipt of the 4 frames of information, system 2 would then buffer the 96 octets and according to the method reconstruct any all zero octets.

An octet which violates either of the above mentioned rules is termed a violating all zero octet (VAZO). The extended superframe consist of 24 frames. Within this superframe, the framing bits of frames 4, 8, 12, 16 and 24 provide the framing pattern sequence. The framing bits of frames 2, 6, 10, 14, 18 and 22 provide the CRC6 code bits. The framing bits of frames 1, 5, 9, 13, 17 and 21 are used to provide the zero byte time slot interchange processing flags in accordance with this method.

These processing flag bits are set to a logic 1, if no zero byte time slot interchange processing was required during the 4 frame interval. Conversely, these processing flag bits are set to logic 0, if this method was employed in order to change any VAZO data before transmission through the system.

This method of zero byte time slot interchange requires only a 2 octet delay at the encoding system and a 96 octet delay at the decoding system. An additional octet of delay is added at both systems in order to examine adjacent octets. In order for a given octet location to be marked by this method as a VAZO, this octet must have been a zero octet and the 2 octets adjacent to it must have a total of 2 ones or less total.

Figure 3A:
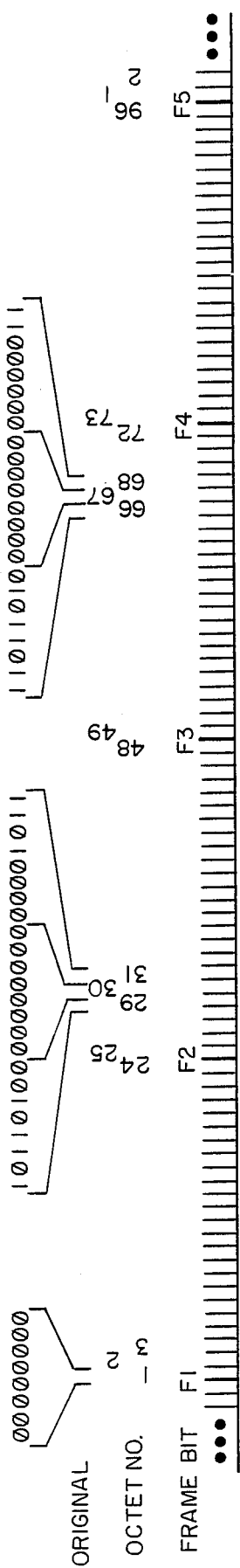
FIGS. 3A and 3B depict a 96 channel data stream before and after the encoding method is applied, respectively.
Figure 3B:
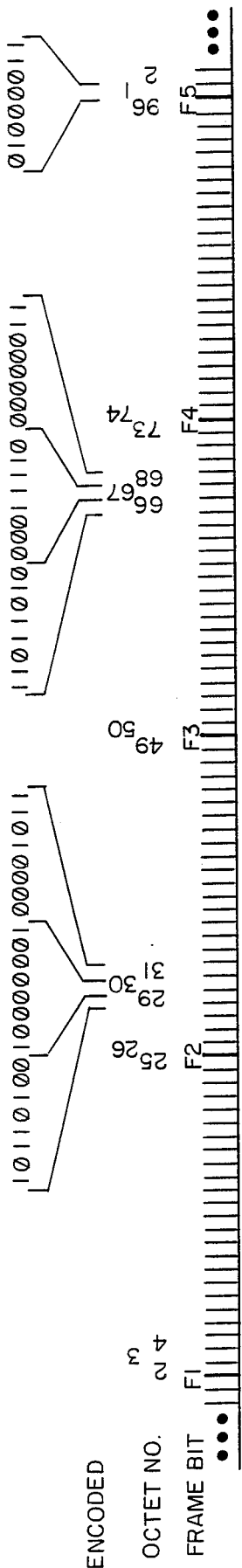

Now turning to FIGS. 3A and 3B, sample data strings are shown. FIG. 3A depicts a 4 frame group of octets as originally transmitted without the use of the zero byte time slot interchange method. This original data string includes 3 octets which are VAZO. These octets are octet 1, octet 30 and octet 67. The octet numbers are shown with their respective contents shown above.

FIG. 3B depicts the resultant 4 frame data string produced as a result of the application of the ZBTSI method to the original data stream of FIG. 3A.

In FIG. 3B, it is to be noted that octet 1 has been removed from the beginning of the data string and placed at the end of the data string in the 96th octet position in modified form. All other octets have been shifted forward or left by 1 octet position. Further, it is to be noted that octets 30 and 67 which were previously VAZO, now incorporate a proper density of logic ones. Octet number 1, which now resides in the 96th octet position, also includes a proper density of logic ones.

Figure 4A:
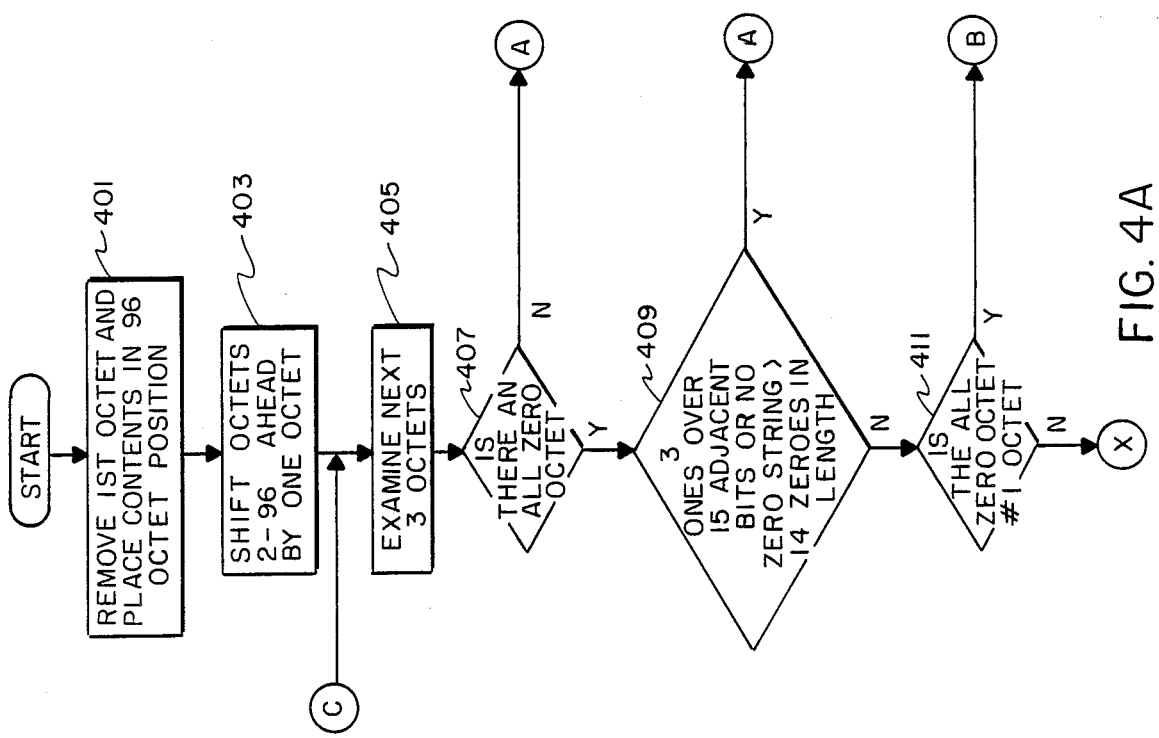
FIGS. 4A and 4B depict a logic diagram of the encoding method.
Figure 4B:
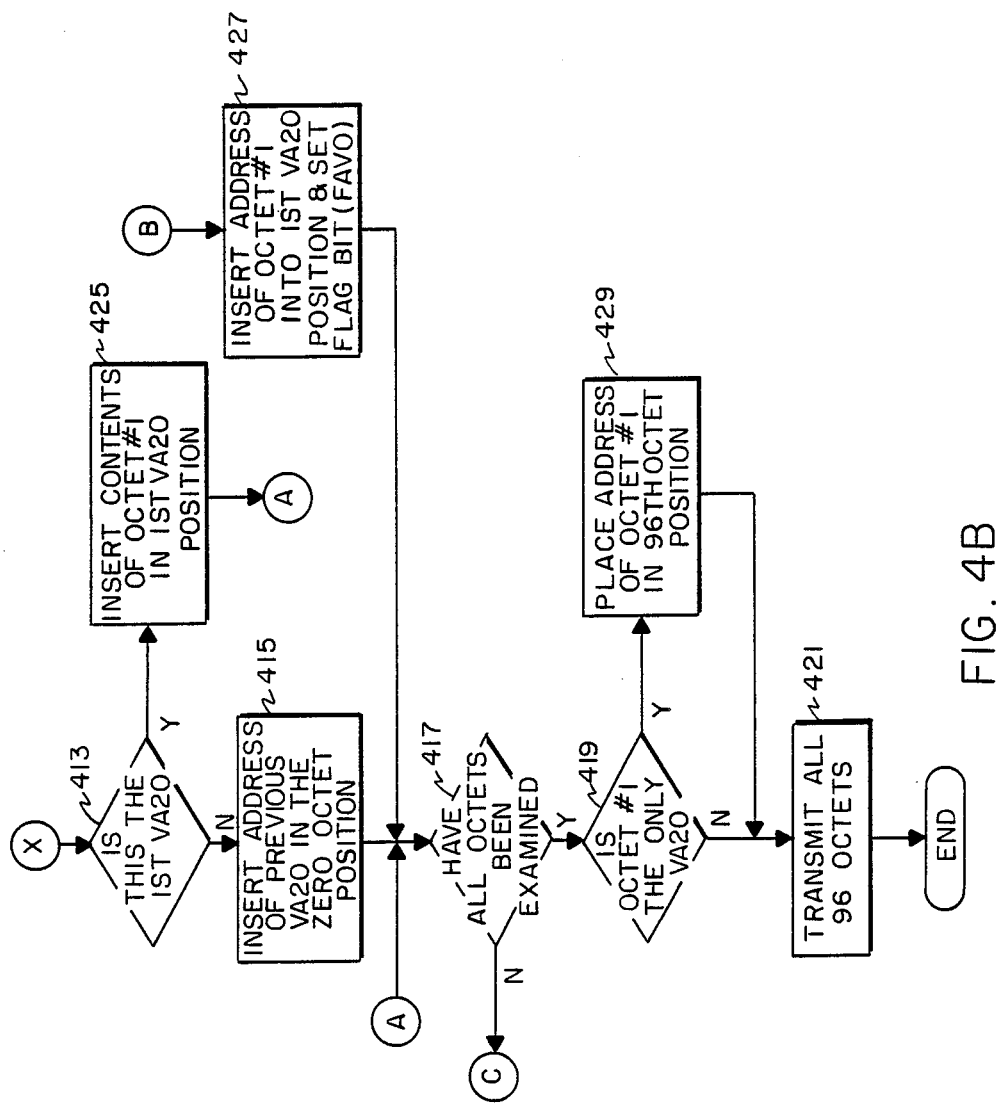

The ZBTSI method is shown in FIGS. 4A and 4B. When the transmitting system has the 4 frame string of data as depicted in FIG. 3A, the logic of this system then performs the ZBTSI method by entering block 401. Block 401 removes the first octet from the data string. Then, the contents of the first octet are placed in the 96th octet position. Block 403 is then entered. Block 403 shifts each of the octets 2 through 96 ahead or left by one octet position.

Block 405 examines the next three octets. Then, block 407 asks whether there is an all zero octet. If there is no all zero octet, control is transferred from block 407 to block 417 via the N path. If there is an all zero octet block 409 is entered via the N path.

Block 409 determines whether the transmission requirements of 3 ones over 15 adjacent bit positions or no zero string greater then 14 zeroes in length are violated. If neither of these transmission requirements have been violated, control is transferred from block 409 to block 417 via the Y path. If one of the transmission requirements has been violated, the N path is taken from block 409 to block 411.

Block 411 determines whether the all zero octet is octet number 1. The Y path of block 411 is followed for an affirmative answer to this question and block 427 is entered. Block 427 inserts the address of octet 1 into the first violating all zero octet position. In addition, the PCM0 bit for this channel will be set to logic 1, indicating that this is the last octet which was a VAZO.

The PCM0 bit of this channel is the flag bit or the first all zero violating octet (FAVO). PCM bits PCM1 through PCM7 of the channel comprise the address of the next VAZO. It is to be noted that the address for octet 1 will always contain a logic 1 in the PCM7 bit position and therefor this octet will not violate the transmission requirements. See FIG. 3B. Block 427 then transfers control to block 417.

If the all zero octet was not octet number 1, the N path will be taken from block 411 to block 413. Block 413 determines whether this octet is the first VAZO. If this octet is the first VAZO, the Y path will be followed from block 413 to 425. Block 425 inserts the contents of octet number 1 into the first violating all zero octet position. Then, block 425 transfers control to block 417.

If this octet is not the first VAZO, the N path is taken from block 413 to enter block 415. Block 415 inserts the address of the previous VAZO into the present octet position which contains the violating all zero octet. As can be seen from the example in FIG. 3B, octet 67 contains the address of the previous violating all zero octet, octet 30. Also, octet 96 contains the address of the previous VAZO, octet 67.

Block 417 determines whether all the octets in the 4 frames have been examined. If all the octets have not been examined, the N path is followed from block 417 to block 405. The above method is iterated until all octets have been examined.

When all the octets of the 4 frames have been examined, the Y path is followed from block 417 to block 419. Block 419 determines whether octet number 1 is the only VAZO. If octet number 1 was the only VAZO, block 429 is entered. Block 429 places the address of octet number 1 in the 96th octet position. Then block 429 transfers control to block 421. If octet number 1 was not the only VAZO, the N path is followed from block 419 to block 421. Block 421 transmits the 96 octets of information. The method is then ended.

It is to noted that when there are two adjacent all zero octets, only the first all zero octet will be altered in accordance with the above method. Since this first all zero octet will now have an appropriate ones density, the second all zero adjacent octet will no longer be a violating all zero octet. Block 409 will make this determination.

The FAVO bit, which is the PCM0 bit of one of the octets, indicates to the decoding logic that this is the last all zero octet within the 4 frame group of octets.

This method may be implemented via firmware contained in a digital signal processor. A Fujitsu digital signal processor part number MB-8764-DSP may be employed.

Although the preferred embodiment of the invention has been illustrated, and that form described in detail, it will be readily apparent to those skilled in the art that various modifications may be made therein without departing from the spirit of the invention or from the scope of the appended claims.

What is claimed is:

1. In a data transmission system having first and second digital switching systems connected via T-carrier line facilities for the bidirectional transmission of data, each said switching system including a method for Zero Byte Time Slot Interchange (ZBTSI), said ZBTSI method comprising the steps of:
   examining a fixed number of octets (8-bits) of a plurality of frames for detection of an all zero octet;
   first testing for a violating all zero octet, said violating all zero octet being an octet which has less than 3 logic ones over 15 adjacent bit positions including said all zero octet or being said octet which has more than 14 consecutive bits of zeroes in its contents, said first testing being performed in response to said detection of an all zero octet;
   first inserting an address of said detected violating all zero octet into a next violating all zero octet position;
   iterating said steps of examining, first testing and inserting for each of said octets for said plurality of frames;
   second testing for an indication whether a first octet is a violating all zero octet, said second testing being performed in response to completion of said step of iterating; and
   first placing an address corresponding to said first octet in a predetermined octet position within said plurality of frames.

2. A ZBTSI method as claimed in claim 1, wherein there included the steps of:
   removing the contents of said first octet; and
   second placing said contents of said first address in a predetermined octet position within said plurality of frames.

3. A ZBTSI method as claimed in claim 2, wherein there is further included step of shifting each of said octets of said plurality of frames, except said first octet, ahead in sequence by one octet position.

4. A ZBTSI method as claimed in claim 3, said step of examining including the steps of:
   third testing each of said octets for an all zero octet; and
   preforming said step of iterating in response to absence of an all zero octet.

5. A ZBTSI method as claimed in claim 4, said step of first testing further including the step of performing said step of iterating in response to absence of said detection of said violating all zero octet.

6. A ZBTSI method as claimed in claim 5, wherein there is further included the step of determining whether said violating all zero octet is said first octet.

7. A ZBTSI method as claimed in claim 6, wherein there is further included the step of second inserting said address of said first octet into an octet position of a first violating all zero octet.

8. A ZBTSI method as claimed in claim 7, wherein said step of determining further includes the step of setting a flag bit in said first violating all zero octet indicating that said first violating all zero octet position is a last violating all zero octet.

9. A ZBTSI method as claimed in claim 8, wherein there is further included step of detecting whether said violating all zero octet is the first violating all zero octet.

10. A ZBTSI method as claimed in claim 9, said step of detecting further including the step of third inserting said contents of said first octet into an octet position of said first violating all zero octet, said step of third inserting being performed in response to said detected first violating all zero octet.

11. A ZBTSI method as claimed in claim 10, wherein said step of third inserting includes a step of performing said step of iterating.

12. A ZBTSI method as claimed in claim 11, wherein there is further included the step of transmitting said data contained in said plurality of frames.

13. A ZBTSI method as claimed in claim 12, said step of examining further including the step performing said step of iterating in response to a detection of two consecutive octets which are violating all zero octets.

* * * * *